Figure 1:
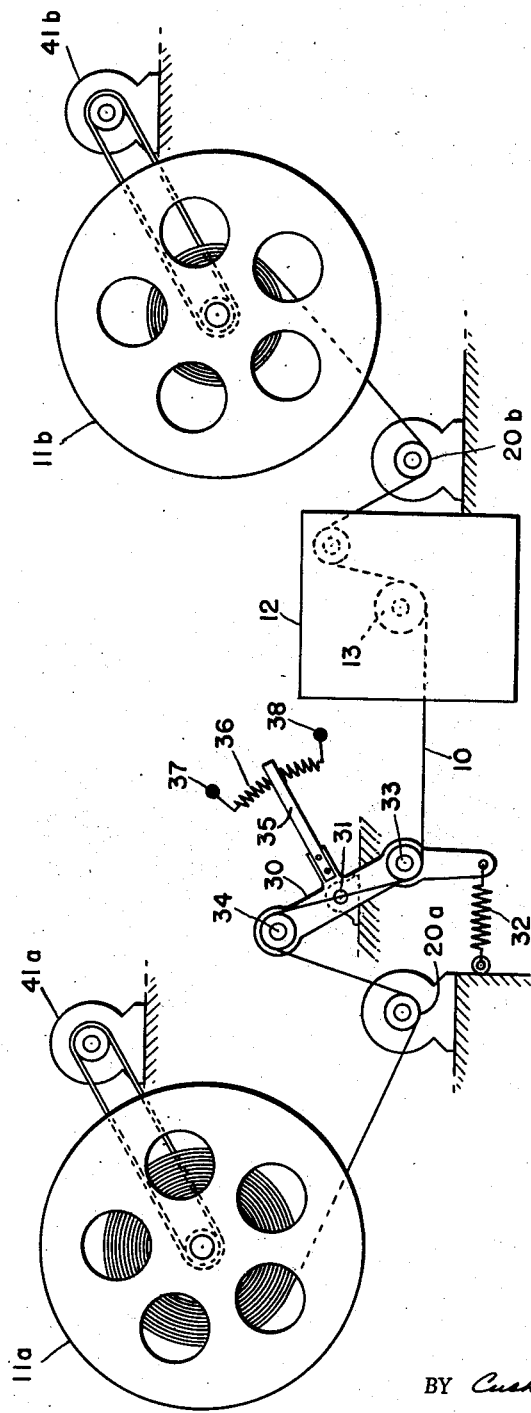

March 2, 1954

H. L. DANIELS ET AL 2,670,906

MEANS FOR WINDING AND REELING

Filed July 19, 1950

3 Sheets-Sheet 1

INVENTORS
HOWARD L. DANIELS
JOHN W. HOGAN

BY Cushman, Darby & Cushman

ATTORNEYS

INVENTORS
HOWARD L. DANIELS
JOHN W. HOGAN

INVENTORS
HOWARD L. DANIELS
JOHN W. HOGAN

BY Cushman, Darby & Cushman
ATTORNEYS

Patented Mar. 2, 1954

2,670,906

UNITED STATES PATENT OFFICE 2,670,906

MEANS FOR WINDING AND REELING

Howard L. Daniels, St. Paul, and John W. Hogan, Minneapolis, Minn., assignors to Engineering Research Associates, Inc., Arlington, Va., a corporation of Minnesota Application July 19, 1950, Serial No. 174,726

18 Claims. (Cl. 242—75)

This invention relates to an improved means for moving a material having one dimension which is very large compared to its other two dimensions. Examples of such material are the following: tape (such as the tape commonly used for the magnetic recording of intelligence, as in a telegraphophone), wire (which, in the case of magnetizable wire, might be similarly employed), ribbon, string, thread, photographic film (such as motion picture film), and sheet metal or other material similarly characterized by its geometry.

As a particular example by which the invention may be illustrated, this disclosure will set forth in detail its application to the winding and reeling of motion picture film, but it is to be understood that this invention is not to be construed as limited thereto, since this material has been selected solely for purposes of illustration.

This invention will be illustrated in terms of a reel-to-reel drive; stated otherwise, the film is here assumed to be passed back and forth between two reels. However, the reels may be dispensed with, or may be used but in the form of flangeless cores, spools (including so-called level-wind spools) and even capstans which would here behave in a substantially similar manner even though a capstan usually unreels from one end as fast as it reels on from the other end.

In general, the invention requires only that means be provided for moving the film.

It is generally recognized that it is desirable in the art of winding and reeling to perform this operation at a constant linear speed in terms of the material being reeled, and with a constant tension within the material being reeled. While this may be but a desirable attribute as far as the winding and reeling itself of some materials is concerned, it frequently happens with other materials that the requirements for constant linear speed and constant tension are mandatory. It is therefore a primary object of this invention to provide such means for winding and reeling at constant speed and at constant tension primarily to satisfy the requirements of associated apparatus, and only secondarily to enhance the winding and reeling operation itself.

It is well-known that, in driving an elongated flexible material (hereinafter referred to as a motion picture film or simply as a film) from one reel to another, the effective diameters of the two reels vary continuously and that, therefore, the reels necessarily cannot be driven at constant angular velocity (i. e., at constant R. P. M.) if constant linear velocity of the film is to be achieved. It has therefore usually been the practice in the past to drive the film primarily by apparatus which applies power directly to the film (sprockets in the case of perforated film or friction rollers in the case of non-perforated film) and to drive or to brake the reels themselves by means of a slipping or frictional drive or brake. Such a procedure is rather wasteful of power and furthermore imposes undue strain upon the film at the point where it passes between the constant-speed drive mechanism and the frictionally urged reeling mechanism. This strain frequently sets up additional and generally undesirable side effects, such as "chatter" which causes the constant speed mechanism or the reels or both to perform considerably less satisfactorily than desired. Furthermore, this method tends to impose undue loads upon the film itself which, in the case of perforated film, generally has the undesirable result of causing the perforations to elongate and thereby prematurely to end the useful life of the film.

It is therefore a primary object of this invention to provide a means for driving a flexible member from one reel to another, to do so at substantially constant speed and at substantially constant tension, and furthermore to do so by applying power only to the reels themselves and not directly to the film.

It is a further object of this invention to drive a flexible member from one reel to another at substantially constant tension and at a precisely constant speed and to do so by applying power primarily to the reels with only a relatively small amount of power being applied directly to the film.

It is a further object of this invention to provide a constant-speed, constant-tension reel-to-reel drive which shall be smooth in its operation.

It is a further object of this invention to provide a self-regulating arrangement to provide constant speed and/or strain of a movable member.

It is a further object of this invention to provide, in connection with the foregoing constant-speed, constant-tension reel-to-reel drive, a means for varying the speed as desired and to do this in such a manner that the drive will assume its newly commanded speed quickly and smoothly with a minimum of transient effects and without any danger that such transients might impose abrupt loads upon the film tending to break and destroy it.

Figure 2:
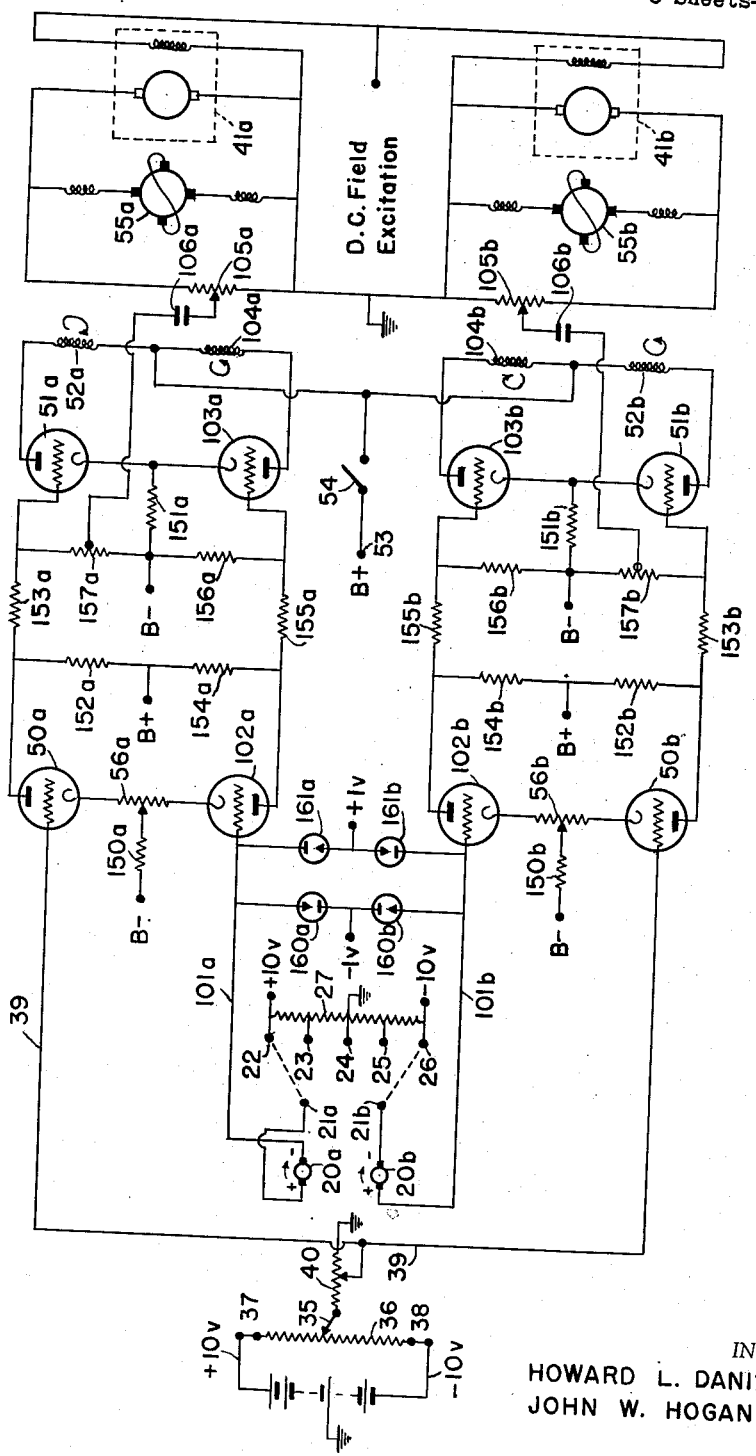

These and other objects of the invention will become apparent to those skilled in the art upon a reading of the following specification in connection with the attached drawings in which:

Figure 1 is an illustration of the preferred embodiment of this invention showing the principal and mechanical parts and the manner in which they are organized into a cooperative unit Figure 2 is a schematic diagram of the electronic portion of the preferred embodiment of this invention; and Figures 3a to 3f are details of a portion of Figure 2 showing the manner in which the electronic equipment is controlled in order to produce the desired movement of the film in the forward or reverse directions.

Referring first to Figure 1, this shows a film 10 which is to be driven between reels 11a and 11b. In a typical case, 10 might be a length of 35 mm. motion picture film and reels 11a and 11b might be the conventional 1000 or 2000 foot reels or cores. In the specific embodiment shown in Figure 1, means are provided for passing film 10 in either direction between reels 11a and 11b at a constant speed and at a constant tension, the speed and tension being under the control of the operator. In passing between reels 11a and 11b film 10 may additionally traverse a work unit 12 (which is not the subject of the present invention) which unit may comprise optical apparatus for projecting pictures or for recording or reproducing sound, or magnetic apparatus or the like. Insofar as the remainder of this invention produces a substantially constant speed and tension, it is also contemplated that the work unit 12 may additionally comprise a constant speed pulley or sprocket 13 by which power may be directly applied to the film 10 in relatively small quantities sufficient to remove the slight remaining irregularities in speed in the remainder of the present invention and thereby achieve a precisely controlled speed without the necessity of applying a large amount of power directly to the film.

In addition to the work unit, the film 10 also passes over two small rollers which serve to drive magnetos 20a and 20b. These may be constructed in any of a number of ways, as is well-known to those skilled in the art, and there are presently a number of such small magnetos commercially available which are quite suitable for this purpose. These magnetos comprise essentially a D. C. generator having a permanent-magnet field and are characterized by the property of delivering a voltage which is proportional to the speed at which magneto is driven, which voltage, furthermore, reverses when the direction of drive is reversed. Figure 1 illustrates a tape path involving two such magnetos.

The above magnetos may be generally referred to as the "speed sensing" portion of the equipment insofar as they provide a voltage whose magnitude and direction is proportional to the magnitude and direction of the film motion. Stated otherwise, they provide an electrical indication of the speed at which the film is actually travelling at each of two locations in the complete film drive. It is particularly to be noted that these small magnetos do not apply power to the film, and also that they require that the film provide only a negligible amount of power to drive them.

To provide for maintaining a predetermined strain in the member 10, a tension sensing device is shown in Figure 1. This tension sensing mechanism comprises essentially an arm 30 pivoted about pivot 31 and urged to rotate clockwise about pivot 31 by means of spring 32. This arm also carries idler rolls 33 and 34, disposed on opposite sides of the pivot 31 as illustrated.

Film 10 is placed upon rolls 33 and 34 in such a manner that decreasing slack (increasing tension) in film 10 tends to rotate member 30 counterclockwise about pivot 31, thereby opposing the force of spring 32. Thus the angular position of member 30 is an indication of the amount of slack (or tension) in film 10. It will be found that the angle of member 30 bears a substantially linear relationship to the differential length of film 10 between the reels, but it is not necessary that this relationship be strictly linear for the purpose of this invention as long as it is substantially linear in the region near the tension desired. Also carried by member 30 is a wiper 35 which contacts an arcuate resistor element 36. In practice, 35 and 36 may comprise the essential elements of an ordinary potentiometer, such as is commonly used in radio receivers for various purposes, which potentiometer may have a rotary shaft concentric with pivot 31.

Resistor 36 terminates in terminals 37 and 38, across which a voltage may be applied in a manner hereinafter specified in greater detail. If this be done, then wiper 35 will pick up a voltage which is indicative of the differential length (or tension) in film 10. There is thus provided a means for sensing the "slack" or "tension" in film 10 and providing a convenient electrical output as an indication of this quantity. Stated otherwise, the tension sensing device functions primarily to indicate the differential length of the film between the reels; secondarily, it may indicate the tension in the film, but this is not essential. For example, the spring 32 might be one of the pre-loaded variety yielding substantially constant torque to member 30 irrespective of the angular position thereof; in this case member 30 assumes a position which is solely a function of the differential length of film 10 between the two reels 11a and 11b.

Reels 11a and 11b are driven by motors 41a and 41b, respectively, which are discussed below.

Referring now to Figure 2, this shows the electronic equipment, including the previously mentioned speed sensing devices 20a and 20b and tension senser resistor 36. The latter is connected with its terminals 37 and 38 across a voltage source of convenient magnitude having its center grounded. As a rough magnitude for illustrative purposes only, this might be a 20 v. battery, center grounded, connected as shown. Then wiper 35 will produce no voltage on lead 39 when the differential film length (or film tension) is correct, whereas if this length is too short (i. e., if the tension be thought of as too high), then wiper 35 and lead 39 will pick up a positive voltage, whereas if the reverse is true of film 10, then wiper 35 and lead 39 will pick up a negative voltage. Voltage divider 40 regulates the amount of voltage picked up by lead 39 for a given discrepancy between the actual film length between reels and that desired or, stated otherwise, potentiometer 40 controls the proportionality factor between the differential length of film 10 and the voltage impressed upon lead 39. Lead 39 as shown in Figure 2 connects directly to the control grids of vacuum tubes 50a and 50b, which tubes will be hereinafter discussed in greater detail.

Also connected across the previously mentioned 20 v. center grounded battery (or across some other convenient source of voltage) is a resistor 27 having a plurality of taps 22, 23, 24, 25 and 26. One of these taps (24) represents the electrical center of the resistor and is grounded.

The other taps are arranged in pair fashion so as to produce voltages of the same magnitude but opposite sign; one pair is here illustrated by 23 and 25 which produce (say) +5 v. on 23 and −5 v. on 25, and another pair is here illustrated by 22 and 26 which produce approximately +10 v. on 22 and −10 v. on 26. Appropriate ones of these pairs are connected to terminals 21a and 21b in a manner which will be more fully explained hereinafter in connection with Figure 3. Continuously movable taps may also be provided.

Provision is made for connecting points 21a and 21b to one set of similar points on resistor 27, as by the indicated dash lines. For the moment it may be said that 21a and 21b always have impressed upon them reference voltages which are the same in magnitude but the opposite in sign; the magnitude of the voltage being indicative of the speed which the operator desires of the film 10 and the relative sign being indicative of the direction in which the operator wishes film 10 to travel. As a specific example, +10 on 21a and −10 on 21b would command film 10 to move at a high speed in a direction hereinafter arbitrarily referred to as "forward," whereas −5 v. on 21a and +5 v. on 21b will command film 10 to move at a slow speed and in the reverse direction.

These terminals are connected directly each to one side of the speed sensing magnetos 20a and 20b, the opposite sides being connected to leads 101a, and 101b which go to the grids of vacuum tubes 102a, and 102b, which vacuum tubes are hereinafter described in greater detail. It is to be noted that the connections to magneto 20a are the reverse of the connection of magneto 20b. That is, if magnetos 20a and 20b are turned in the same direction, the magneto potentials on outgoing lines 101a and 101b is opposite. This is indicated in Figure 2 by the signs and directional arrows at 20a and 20b. At this point, it might be observed that, under steady-state conditions, leads 101a and 101b each carry a voltage which is proportional to the difference between the desired speed of the film and its actual speed as sensed by the speed sensing magnetos. The polarities of 101a and 101b are, at all times, opposite.

With the equipment as thus far described, it is apparent that a film moving from reel 11a to reel 11b at a given speed is generating a predetermined potential on leads 101a and 101b. If connections are made between 21a—22 and 21b—26, and if 20a and 20b are each generating say 9 volts, then lead 101a will be at +10−9=+1 volt and lead 101b will be at −10+9=− 1 volt. Now if it is assumed that the film speed should increase for some reason, the voltages generated at 20a and 20b will each increase, say to 10 volts. The result will be that 101a will now be at +10−10=0 volts and 101b will be at −10+10=0 volts. The voltage difference between 101a and 101b is now 0 volts rather than 2 volts, and it is clear that this decrease in voltage may be employed in a negative feed-back sense to self-regulate the speed of the film. Decrease in film speed has the opposite effect.

It will also become apparent from the following that the potential on lead 39 can be employed in a negative feed-back sense to self-regulate the tension in the film.

The remaining portion of the apparatus of Figure 2 is one system for utilizing the signals previously discussed in a manner to control the driving motors of the reels 11a and 11b to provide the self-regulation referred to above. In practice, some sort of amplification between the input and outputs will be required, and it is appropriate at this point to determine the requirements of a suitable amplifier. For input there is available the following: (1) on lead 101a a signal indicating the difference between the desired and the actual speed of film 10, in the vicinity of reel 11a; (2) on lead 101b a signal bearing the same intelligence as 101a but with respect to the speed in the vincinity of reel 11b and at all times opposite in sign to 101a; and (3) on lead 39 a voltage which is zero for the correct differential film length and positive or negative if this quantity is insufficient or excessive.

For outputs there must be provided a source of power to each of two driving motors such that each tends to drive the film at the proper speed but so arranged that there is a slight difference between the two power inputs such that the proper length and tension is maintained in the film between reels.

Obviously there are a great many ways to accomplish the necessary amplification and it is not the purpose of this invention to set forth any one method to the exclusion of all others. However, the method illustrated in Figure 2 has been reduced to actual practice and has been given rigorous testing, during which the system behaved extremely well; for this reason, the embodiment described in connection with Figure 2 may be considered a preferred form for the exercise of this invention.

The apparatus in Figure 2 comprises two 3-stage push-pull amplifiers which are coupled in such a manner as to permit the amplification of D. C. signals. Of the three stages involved, the first two comprise a quite conventional direct-coupled push-pull vacuum tube amplifier which is believed to be sufficiently well-known that it need not be described in detail herein. The third stage involves the use of a device known as a compensated armature reaction excited dynamo-electric machine, and which is popularly called an amplidyne. Briefly, this device is a power amplifier capable of delivering quite large amounts of power output from quite small amounts of power input; it is typically a very specialized type of D. C. generator having a response very sensitive to changes in the excitation field voltage. Such amplidynes derive their power from an external rotating mechanical source and hence it follows that the amplidyne generators shown in Figure 2 must be rotated constantly by some means (such as by electrical motors) which are not shown on the diagram. The amplidyne also lends itself nicely to the purposes of this invention in that it may be so connected that it may be provided with two input circuits for push-pull connection to the preceding vacuum-tube stages, thus providing the well-known benefits of push-pull operation, such as harmonic elimination and the like.

Proceeding now with an explanation in greater detail of the preferred type amplifier, two units are shown in Figure 2, comprising two identical channels which are similarly labeled except for the characters a and b; hence it is necessary to describe only one unit. Vacuum tubes 50a and 102a effectively constitute a push-pull circuit by virtue of the common cathode resistor 150a. The power gain from a single stage being normally insufficient, it is necessary to provide one more stage comprising two tubes 51a and 103a having a common cathode resistor 151a. The first and second stages are direct-coupled by means of resistors 152a, 153a, 154a, 155a, 156a and 157a, the last named being provided with an additional tap for a purpose hereinafter to be explained in greater detail. The plates of the last tubes 51a and 103a are connected by the amplidyne exciter windings 52a and 104a to a common source of plate voltage 53 via the normally closed switch 54. This provides the excitation for the amplidye shown schematically at 55a, the output of which is directly connected to the armature of drive motor 41a of reel 11a. The field of 41a is directly connected to a source of direct current. The windings 52a and 104a are connected in opposition so balanced plate currents cancel the amplidyne field.

The lower channel is identical except for the subscript b.

It is important that the connections be made in the proper manner so that the apparatus will behave as desired. In order that this may be accomplished in accordance with this invention, and in order that those skilled in the art may exercise this invention without the necessity for dealing with conventions of sign which are not universally accepted at this time, the following is given by way of explanation: With leads 21a and 21b grounded, and the film removed, the tension sensing device of Figure 1 should be moved clockwise (indicative of excessive "slack" or insufficient "tension" in the film), in which case the reels 11a and 11b should move opposite to each other in the direction necessary to decrease the "slack" or to increase the "tension"; similarly with the tension sensing element 39 rotated counterclockwise (which is the condition indicative of insufficient "slack" or excessive "tension") the reels 11a and 11b should tend to rotate to pay out film towards each other (which is in the manner necessary to increase "slack" or to relieve "tension"). If it is found that this is not the case, then the film motor which is turning incorrectly (or both if both are turning incorrectly) should have its armature connections to its associated amplidyne output interchanged, after which it will be found that correct operation is assured. Next, lead 39 should be grounded. The magneto 20a should now be given a spin in the direction it would move if reel 11a were paying out film; this should cause reel 11a actually to move in the opposite direction. If this is not the case, the input and output of 20a should be reversed. The process should be repeated with respect to magneto 20b and reel 11b. Stated otherwise, the generation of proper voltages in magnetos 20a and 20b should produce opposite rotation of reels 11a and 11b in a direction tending to increase the tension in the film.

From the foregoing, it will be understood that when leads 39 and 101a are at ground potential, the currents in windings 52a and 104a are equal and no amplidyne output exists. And it follows that the voltage generated in magneto 20a must so move the grid of tube 103a to change the current in winding 104a so that the amplidyne output rotates motor 41a opposite to the rotation of magneto 20a.

Channel b is understood from the foregoing analysis of channel a.

After the above tests have been completed, it will be found that 20a and 20b are oppositely connected as to polarity when rotated in the same direction. This condition is schematically illustrated in Figure 2.

Probably it will also be noticed that there are some asymmetries in the equipment due to unavoidable discrepancies between manufactured articles. For example, it may be found that the film reels each have a tendency to "creep" a little even though zero speed is commanded by the grounding of leads 21a and 21b; if this is the case, the appropriate reel can be balanced to a stop by adjusting a balancing control such as 56a or 56b of Figure 2, whereby the windings 52 and 104 are placed in complete opposition. Likewise, it may be found that the tension control tends to dominate the speed control, making for somewhat erratic operation; this in turn can be corrected by diminishing the setting of potentiometer 49 previously mentioned in connection with the tension sensing mechanism.

One reason why the apparatus of Figure 2 represents a preferred embodiment of this invention is that it has three amplification stages and therefore provides a good means for "inverse feed-back" without going all the way back to the original or buffer stage. Inverse feed-back is desirable and is a standard well-known means to prevent high frequency oscillations which might well arise in an organization of this complexity. It is recognized that somewhat simpler circuits, might serve equally well in the practice of this invention, but the present arrangement is to be preferred, particularly if one desires to practice this invention in the pioneering of controls which involve substantially new operating requirements such as wide ranges of speed requirements and film reel diameters. One suggested means for accomplishing inverse feed-back is shown in Figure 2. This comprises a potentiometer 105a connected across the output of amplidyne 55a, the output of which is capacitively coupled by condenser 106a to the tap on resistor 157a. This serves to feed back a portion of the A. C. component only of amplidyne 55a into the grid of 51a, thereby effectively cancelling out fortuitous oscillations in the output of 55a.

The above discussion of inverse feed-back is not to be confused with the broader concept of self-regulation negative feed-back between the drive motors and the magnetos and tension senser. The term "negative" rather than "inverse" is purposely included in the appended claims to refer to the latter.

Figure 3 illustrates a preferred method by which the proper (equal but opposite) potentials can be impressed upon leads 21a and 21b. Views 3a through 3d illustrate a typical case in which it is desired that the film be driven at either high or low speed and in either of two directions, one of which is arbitrarily called "forward" and the other of which is arbitrarily called "reverse."

From these drawings, it is apparent that the voltages on 21a and 21b for the above conditions might be tabulated substantially as follows:

| 21a | 21b | Condition |
|---|---|---|
| +10 | −10 | High Speed Forward. |
| +5 | −5 | Low Speed Forward. |
| −5 | +5 | Low Speed Reverse. |
| −10 | +10 | High Speed Reverse. |

Figure 3A:
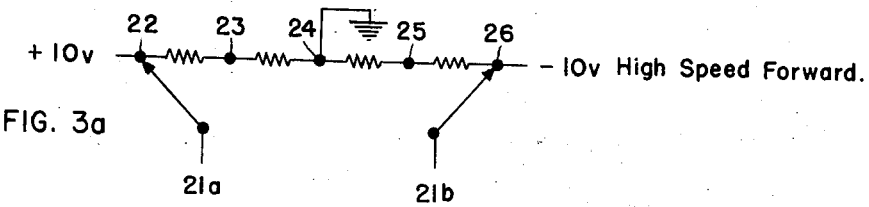
Figure 3B:
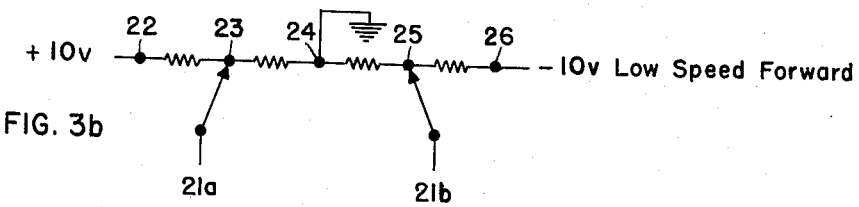
Figure 3C:
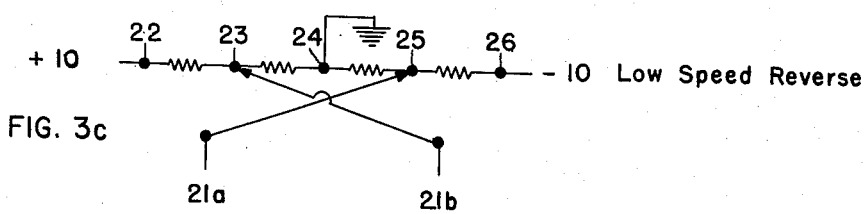
Figure 3D:
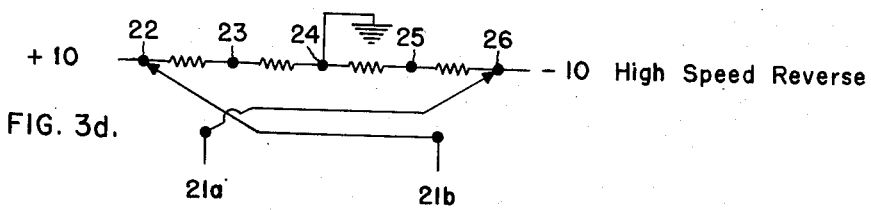
Figure 3E:
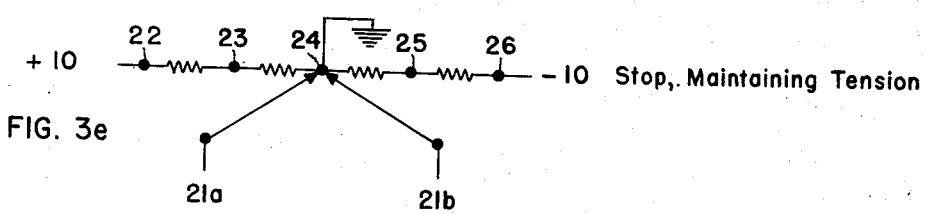

Figure 3e illustrates what is necessary in order to stop the reel drive while maintaining the desired tension in the film; in this case it is obviously necessary to connect both 21a and 21b to ground. If it is desired to stop the reels and also to relieve all tension, then the connections of 3e should be made and, additionally, switch 54 of Figure 2 should be opened; this is an effective measure for handling emergency conditions which require coasting to a stop to prevent film breakage.

Figure 3F:
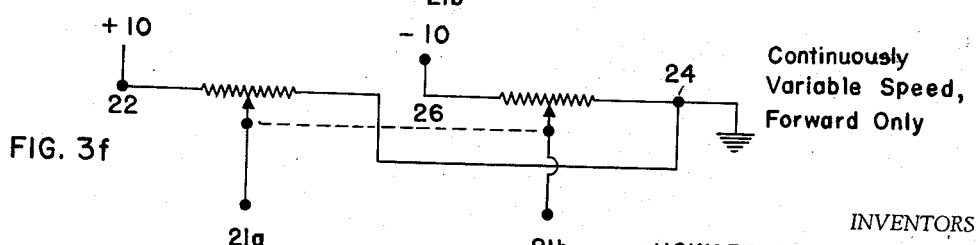

Figure 3f shows the type of control which would be required in order to achieve a continuously variable speed control and this illustration has been simplified by assuming that it is here required only to operate in one direction. Persons skilled in the art will have no difficulty in understanding how 3f might be modified for continuously variable speed control in either direction in view of the teachings of 3a—3e.

An additional feature useful in the practice of this invention is the organization of the four diodes 160a, 161a, 160b, 161b, connected as shown in Figure 2. These serve to limit the excursions of the leads 101a and 101b to not more than about one volt (plus or minus), thereby precluding overloading of the amplifiers under transient conditions. Such an overload might otherwise arise, for example, immediately after commanding a new speed by a manipulation of the connections of Figure 3. Under such transient conditions the film might break, but the diodes serve to keep the incoming speed-error signal within limits (about plus or minus one volt) which are compatible with the signals which the potentiometer 30 is capable of delivering.

From the foregoing description, it will be apparent that a winding system is provided in which it is convenient to regard each reel of the system with its magnets and amplidyne as a separately functioning device. That is, each amplidyne attempts to drive its moving means at a constant speed, which speed is in the illustrated embodiment that whereat the magneto voltage cancels the reference voltages. It will be understood that opposite polarities are not necessary, but could be otherwise with other circuit connections. The two speed regulating devices are linked only by the length sensing (or tension sensing) device, which attempts to increase the lower speed and decrease the higher speed to compel the reels to remain in step and to also maintain constant length and tension between the reels.

It will be understood that the foregoing detailed illustration has been made only for purposes of a description of our invention. Many other embodiments of our invention will occur to others, and therefore, we intend that the scope of the invention be determined from the appended claims.

We claim:

1. In apparatus for moving an elongated member at predetermined speeds under predetermined tension, at least two spaced means for moving the member, the moving means being adapted to move the member in either of two directions at varying speeds, means for sensing the tension in the member between the moving means, the tension sensing means having control connection means to each of the moving means, the said control means being arranged to supply a first partial control input to tend to cause movement of the respective moving means in opposite directions to establish tension in the member, the tension control means further comprising means for self-regulating the tension in the member, speed sensing means positioned in juxtaposition to the member at either side of the tension sensing means and arranged to detect the speed of the member at said locations, each speed sensing means also having control connection means to one of the moving means and arranged to supply a second partial control input to tend to cause movement of the moving means in like directions to move the member in a given direction, the speed control connection means further comprising means for self-regulating the speed of the associated moving means, the moving means being arranged to respond to the control input through the tension connection means and the speed connection means according to the division of partial inputs from each of said control sources.

2. Apparatus as in claim 1 in which the tension control connection means and the speed control connection means to each moving means are combined in a push-pull amplification channel.

3. Apparatus as in claim 2 in which the amplification channel comprises an armature reaction excited dynamo-electric machine having control fields connected in push-pull relationship.

4. Apparatus as in claim 1 in which the speed control means comprises means for determining a reference speed and reference direction of motion of the associated member moving means.

5. Apparatus as in claim 4 in which each of the speed detecting means is a voltage generator having an input and output, and wherein the inputs are adapted for connection to sources of reference potentials for providing different speeds and direction of movement of the member.

6. In apparatus for moving an elongated flexible member at a predetermined speed under a predetermined tension, spaced motor driven means for moving the member, voltage generating speed sensing means positioned in operative relation to the member along the member, a resiliently biased tension sensing device located between the motor driven means, the tension sensing device being operated by changes in the length of the member between the moving means and comprising means for providing a voltage related to the length of the member between the moving means, amplifier means connected in a path between the tension voltage source and each of the motor moving means, the amplifier means being connected to the motor means to tend to rotate the moving means in opposite directions to establish tension in the member, the path which includes the amplifier means also providing self-regulation of the tension, each of the voltage generating speed sensing means being connected to control one of the motor moving means to move the member in a predetermined direction, the last mentioned connection being through amplifier means, and the last mentioned amplifier means providing phase reversal, whereby the speed of each motor moving means is self-regulated by the voltage generated by the speed sensing devices.

7. Apparatus as in claim 6 wherein separate amplification channels extend from the tension sensing voltage source to each motor moving means.

8. Apparatus as in claim 7 wherein each of the said separate tension amplifying channels is combined with the speed sensing amplification channel to the respective motor moving means in push-pull relationship.

9. Apparatus as in claim 6 wherein the speed sensing devices are electrically connected to operate at different reference potentials, whereby more power will be initially applied to one motor means than to the other, whereby the elongated member will come up to a predetermined speed in a predetermined direction.

10. Apparatus as in claim 9 wherein the speed sensing devices are connected to generate opposed voltages, whereby changes in the speed of the member causes the motor means to tend to rotate oppositely to self-regulate the speed.

11. Apparatus as in claim 6 wherein the amplification means includes a stage comprising an amplidyne.

12. In apparatus for reversibly moving a flexible elongated member at a predetermined speed under predetermined internal strain, two spaced motor driven member moving means, a strain sensing device in the path of the elongated member between the spaced moving means, the strain sensing device being adapted to be operated by the member, the strain sensing device being resiliently biased and adapted to produce a voltage which is a function of the length of the member between the moving means, speed sensing means also positioned to be operated by the member, the speed sensing means being arranged to produce two voltages which are a function of the speed of the member, an amplification channel connected between the strain voltage source and each motor drive, the motors being connected to their respective strain amplification channels to provide balanced opposing torques in the motors to produce strain in the member, the arrangement also providing self-regulation of the strain, separate amplification channels connected between each source of speed voltage and one of the motor drives, the connection of the respective motor drives to the last mentioned amplifier channels being arranged to tend to produce torques in the drives to move the member in a predetermined direction, means for placing the two speed voltage sources at reference potentials, and means including the speed amplification channels to detect changes in the speed voltages, whereby the motor drives will move the member in a predetermined direction under predetermined strain, the amplification channels between the two voltage sources and the connected motor drives including means providing phase reversal, whereby the speed is self-regulated.

13. Apparatus as in claim 12 wherein the amplification channels connected to the respective motor drives are arranged in push-pull relation.

14. Apparatus for moving an elongated member comprising, two spaced member moving means, means for sensing the speed of the member, the speed sensing means including generator means adapted to be operated by the member for providing two voltage sources, each voltage source having an input and output side, which voltage sources reverse polarity when the direction of movement of the member is reversed, and which voltage sources are a function of the speed of the member, the output side of each of the voltage sources being connected to control one of the moving means, the connections including phase reversal to provide self-regulation of the speed of the member, the connections also being such that the member moving means tend to introduce tension in the member, and means to connect the inputs of the voltage sources to reference potentials, whereby the voltage connected to control the said moving means causes the moving means to move the member in a predetermined direction.

15. Apparatus as in claim 14, wherein means are provided for reversing the direction of movement of the member, said means comprising means for interchanging the connection of the input sides of the voltage sources with the said reference potentials.

16. Apparatus as in claim 14, wherein means are provided for controlling the speed of the member in a predetermined direction, said means including means for changing the potential between the two reference potentials.

17. Apparatus as in claim 14, wherein the voltage sources are arranged to be of opposite polarity from input to output sides when operated by the moving member, whereby under incremental changes in speed of the moving member power is removed from one moving means and added to the other moving means to self-regulate the speed of the member.

18. Apparatus as in claim 14 and further including spring biased means to sense the length of the member between the spaced moving means, the length sensing means being arranged to produce a voltage which is a function of the length, the length voltage being connected for superposition on the speed voltages to further control the member moving means to maintain a predetermined tension in the member.

HOWARD L. DANIELS.
JOHN W. HOGAN.

References Cited in the file of this patent
UNITED STATES PATENTS

| Number | Name | Date |
| --- | --- | --- |
| 1,848,663 | Robinson, Jr. | Mar. 8, 1932 |
| 2,214,355 | Tiselius et al. | Sept. 10, 1940 |
| 2,292,511 | Ferm | Aug. 11, 1942 |
| 2,325,381 | Edwards et al. | July 27, 1943 |
| 2,363,684 | Montgomery | Nov. 28, 1944 |
| 2,469,706 | Winther | May 10, 1949 |
| 2,474,620 | Fath | June 28, 1949 |
| 2,512,378 | Puchlowski | June 20, 1950 |